2 Sheets. Sheet 1.

J. Oothoudt,

Lath Machine.

No. 101,653. Patented Apr. 5, 1870.

Witnesses
John A. Ellis
Henrie N. Miller

Inventor
J. Oothoudt,
Per,
J. H. Alexander,
Atty.

J. Oothoudt,

Lath Machine.

No. 101,653. Patented Apr. 5, 1870.

Witnesses
John A. Ellis
James V. White

Inventor
J. Oothoudt
Per.
T. H. Alexander,
Atty.

United States Patent Office.

JOSIAH OOTHOUDT, OF MINNEAPOLIS, MINNESOTA.

Letters Patent No. 101,653, dated April 5, 1870.

---

IMPROVEMENT IN LATH-MACHINE.

---

The Schedule referred to in these Letters Patent and making part of the same.

---

*To all whom it may concern:*

Be it known that I, JOSIAH OOTHOUDT, of Minneapolis, in the county of Hennepin and State of Minnesota, have invented certain new and useful Improvements in Lath-Machines; and I do hereby declare that the following is a full, clear, and exact description thereof, reference being had to the accompanying drawings and to the letters of reference marked thereon, which form a part of this specification.

The nature of my invention consists in the construction and general arrangement of a machine for sawing laths, pickets, &c., whereby I am enabled to saw a series of bolts or blocks at the same time with one saw.

In order to enable others skilled in the art to which my invention appertains to make and use the same, I will now proceed to describe its construction and operation, referring to the annexed drawings, in which—

Figure 1:
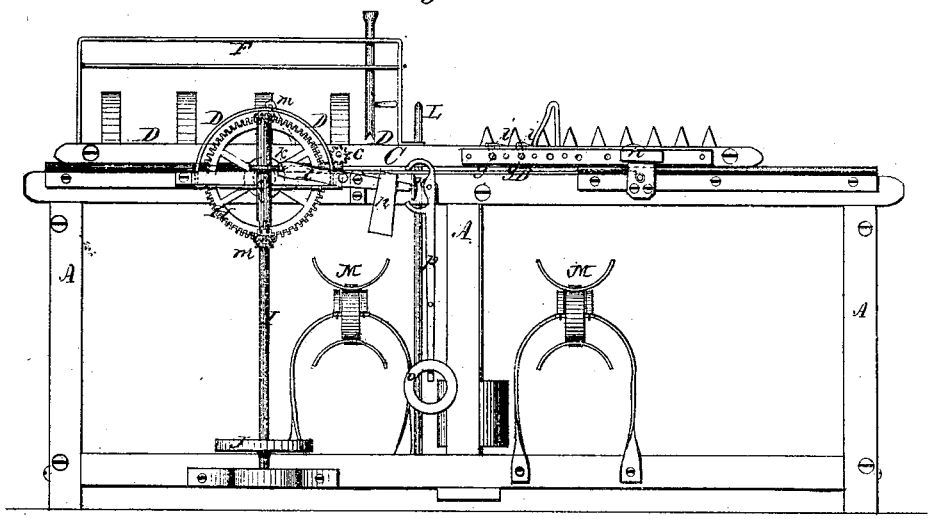
Figure 2:
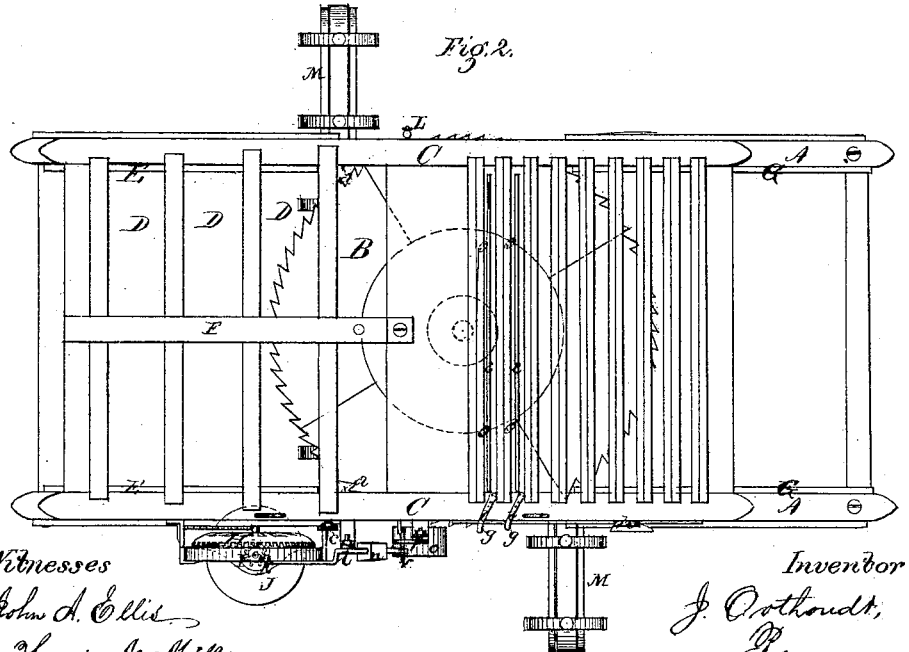
Figure 3:
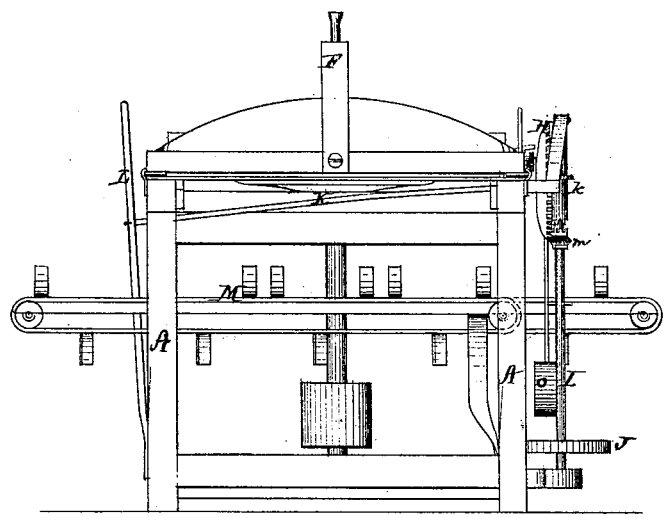
Figure 4:
Figure 5:
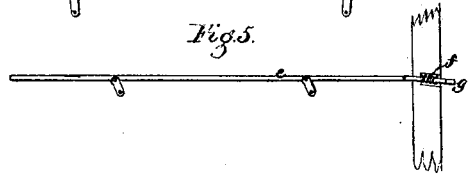

Figure 1 is a side elevation;
Figure 2, a plan view; and
Figure 3, an end view of the machine.
Figure 4 is a plan of the right and left-hand screw, showing how the dogs are operated; and
Figure 5 is a side view of the spiral spring, clamp, and pin.

A represents the frame of the machine, in the center of which is mounted horizontally the circular saw B, which is made in sections upon a cast-iron center.

Upon the frame A moves the carriage C, one-half of which is made so as to form spaces D D.

These spaces receive the slabs, which are held in place by dogs $a\ a$, moved back and forth by right and left-hand screws $b\ b$.

The screws are turned by small pinions $c\ c$, passing through the rack $d$ on the frame A.

The movable ways E E, on the inside of the frame below the slab-holders, are for the purpose of regulating the thickness of the bolt to be sawn from the slab, and the upright dogs F F, above the slab-holders, are to keep the slabs from tipping down when first placed in the machine.

The other half of the carriage C is provided with a series of clamps, $e\ e$, for the purpose of holding, sidewise, bolts from which are to be sawn laths, &c.

The movable clamp $e$ is operated by a spiral spring, $f$, around the clamp-pin $g$, in connection with the bevel-lug or cam $h$ on the side of the frame A.

The little spring and catch $i$, over the clamp-pin $g$, is for the purpose of holding the clamp open after it has passed to the right of the bevel-lug $h$, so that the operator can put in bolts while the carriage is in motion.

On top of the bevel-lug $h$ is an oval projection to raise the catch $i$ out of the notch in the clamp-pin, so that the clamp will fasten the bolt the instant it passes to the left of the lug.

Below the clamps, inside of the frame A, are adjustable ways G G to regulate the thickness.

On the side of the frame A is a bevel-gear, H, on the same shaft with which is a small pinion working in a rack-bar on the under side of the carriage C, to move the same in either direction.

The shaft I, pulley J, and pinions $m\ m$, communicate motion to the gear-wheel H, while, by means of the clutch $k$, lever $l$, and weights $n\ o$, I am enabled instantly to reverse the motion of the carriage.

The weight $n$ on the clutch-lever $l$ balances the clutch, so that it will remain up or down, as the case may be, and the upright lever $p$, carrying the weight $o$, being disconnected from the clutch, is carried up by the tappets on the carriage until the weight is past the center, when it falls, driving the clutch into the opposite gear, which shifts the feed at once.

On the same side of the machine is a crotch and rod, K, connected with the upright lever L on the opposite side, for the purpose of throwing the clutch out of gear at will.

On each side of the saw B is an endless rack, M, to receive the bolts cut from the slabs at one end of the machine, and the laths, &c., cut at the other.

Having thus fully described my invention,
What I claim as new, and desire to secure by Letters Patent, is—

1. The arrangement of the frame A, saw B, carriage C, adjustable ways E G, dogs $a\ a$, screws $b$, pinions $c$, racks $d$, clamp $e$, spring $f$, pin $g$, lug or cam $h$, and spring catch $i$, all constructed and operating substantially as herein set forth.

2. The arrangement with the above of the gear H, shaft I, pulley J, pinions $m$, clutch $k$, levers $l\ p$, weights $n\ o$, notch and rod K, lever L, and endless racks M M, all substantially as and for the purposes herein set forth.

In testimony that I claim the foregoing as my own, I affix my signature in presence of two witnesses.

JOSIAH OOTHOUDT.

Witnesses:
ALBEE SMITH,
A. J. TROP.